United States Patent [19]

Camp

[11] 3,913,714
[45] Oct. 21, 1975

[54] CLUTCH RELEASE MECHANISM
[75] Inventor: John Walter Aldridge Camp, Colchester, England
[73] Assignee: Ford Motor Company, Dearborn, Mich.
[22] Filed: June 28, 1973
[21] Appl. No.: 374,743

[30] Foreign Application Priority Data
June 28, 1972 United Kingdom............ 30226/72

[52] U.S. Cl................. 192/99 S; 192/98; 192/110 B
[51] Int. Cl.². ................ F16D 19/00; F16D 13/60; F16D 23/00
[58] Field of Search...... 192/98, 110 R, 110 B, 99 S

[56] References Cited
UNITED STATES PATENTS

| | | | |
|---|---|---|---|
| 2,121,418 | 6/1938 | Barish | 192/110 B |
| 3,099,340 | 7/1963 | Camp | 192/99 S |
| 3,250,357 | 5/1966 | Zeidler | 192/99 S X |
| 3,416,637 | 12/1968 | Maurice | 192/98 |
| 3,604,545 | 9/1971 | Bourgeois | 192/98 |
| 3,741,361 | 6/1973 | Brandenstein | 192/110 B |
| 3,744,607 | 7/1973 | Hausinger | 192/98 |

*Primary Examiner*—Samuel Scott
*Assistant Examiner*—Lance W. Chandler
*Attorney, Agent, or Firm*—Clifford L. Sadler; Keith L. Zerschling

[57] ABSTRACT

A clutch release mechanism having a support member with a radial flange. A self-centering clutch release bearing is disposed on one side of the flange and a clutch release lever is disposed on the other side of the flange. A pair of loop springs holds the lever and the bearing in engagement with the flange.

8 Claims, 1 Drawing Figure

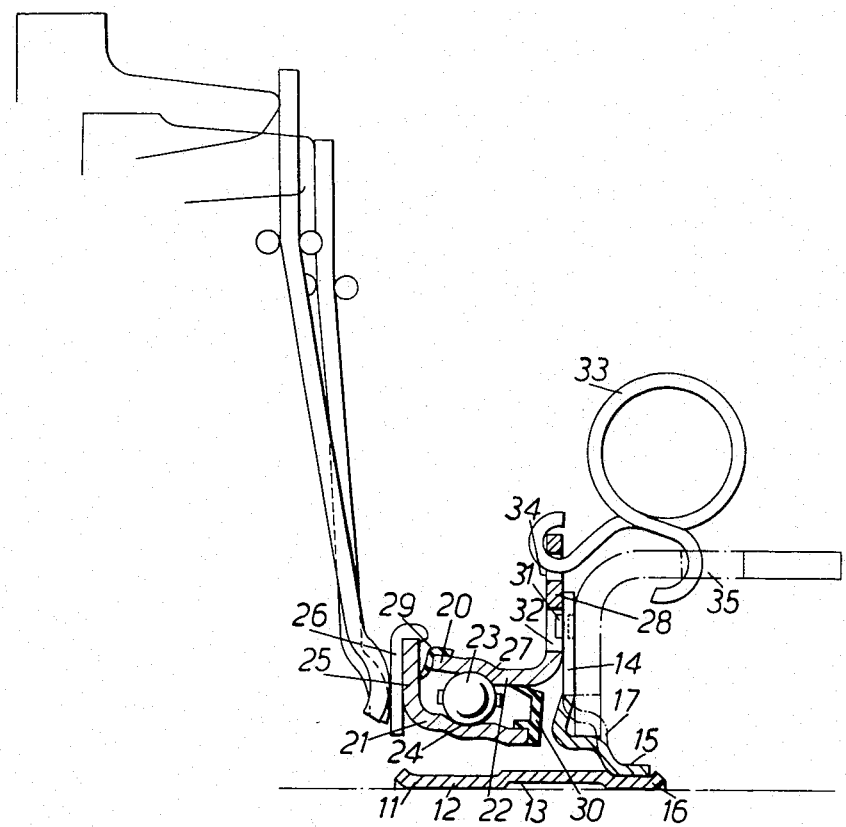
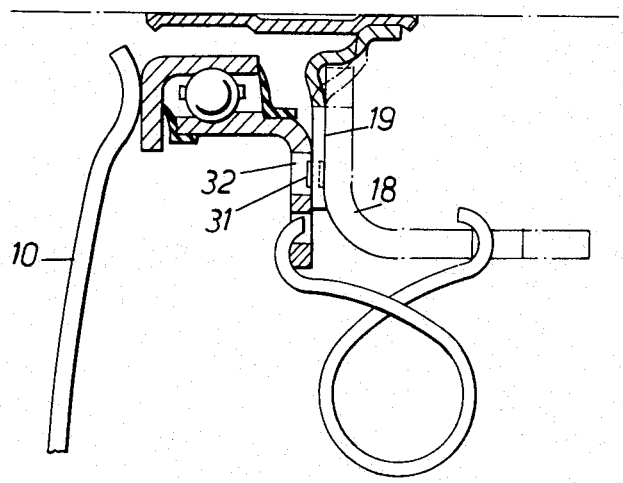

CLUTCH RELEASE MECHANISM

BACKGROUND AND SUMMARY OF THE INVENTION

This invention relates to a self-centering clutch release mechanism suitable for a motor vehicle transmission clutch.

The clutch release mechanism of the present invention is similar in principle to that disclosed in U.S. Pat. No. 3,788,437.

According to the invention a clutch release mechanism has the following features:

a. a clutch release bearing carrier has a radially extending flange;

b. spring means extend between a clutch release bearing on one side of the flange and a clutch release lever on the other side of the flange to hold both the bearing and the lever in contact with the flange; and c. the clutch release bearing has limited radial movement relative to the flange of the bearing carrier so that in use it centers itself about the axis of rotation of the clutch and is held in a centered position by friction at the contacting radially extending surfaces of the bearing and the flange.

BRIEF DESCRIPTION OF THE DRAWINGS

The invention will now be described with reference to the accompanying drawing in which the single FIGURE is an axial cross section of a clutch release mechanism embodying the invention.

DETAILED DESCRIPTION OF THE PREFERRED EMBODIMENT

A motor vehicle clutch having an axis of rotation A includes a diaphragm spring 10 of a clutch pressure plate assembly. A clutch release mechanism includes a clutch release bearing carrier 11 slidably mounted on a fixed guide (not shown) aligned with the axis of a gear box. Owing to production tolerances inevitably arising in the manufacture of the assembly, the gear box axis and the axis of the guide are usually somewhat offset from the clutch axis A.

The carrier 11 includes a sleeve 12 formed from tubular material with a lubrication channel 13 in its inner surface. A radially extending flange 14 is formed integrally by pressing from sheet metal with a mounting portion 15. The mounting portion 15 extends axially and is a tight fit on the sleeve 12. The mounting portion 15 is located axially of the sleeve 12 by engagement with one end of the lubrication channel 13 and an outwardly turned end portion 16 of the sleeve 12.

The mounting portion 15 is formed with diametrically opposed notches 17 which receive projection from an opening in a clutch release lever 18. The clutch release lever 18 is connected at one end to the clutch housing and at its other end to a clutch actuating mechanism, for example, a Bowden cable.

A curved portion 19 intermediate the ends of the release lever is in rolling contact with one side of the carrier flange 14.

A clutch release bearing 20 includes an inner race 21, an outer race 22 and ball bearings 23. The inner race 21 is formed by pressing from sheet metal with a machined groove 24 for receiving the ball bearings. A radially outwardly extending flange portion 25 of the inner race 21 bears a thrust plate 26 which contacts the diaphragm spring 10.

The outer race 22 also formed by pressing from sheet metal with a machined bearing groove 27 has a radially outwardly extending flange 28 in face-to-face contact with the flange 14 of the carrier 11. Rubber seal members 29 and 30 prevent escape of grease from the bearing 20.

Dimples 31 pressed from the surface of the flange 14 which contacts the outer race 22 are each received in corresponding apertures 32 in the flange 28 of the outer race 22. The apertures 32 are of greater diameter than the dimples 31 thereby permitting limited movement of the clutch release bearing radially of the carrier 11.

Springs 33 are each connected between an aperture 34 in an outer portion of the flange 28 and an aperture 35 in the clutch release lever 18. The springs 33, on at each side of the clutch release lever 18, hold the bearing flange 28 in pressure contact with one side of the flange 14 of the carrier 11 and at the same time hold the curved surface 19 and the clutch release lever 18 in contact with the other side of the flange 14.

In operation, the forces acting at the interface between the diaphragm spring 10 and the clutch release bearing when the release mechanism is out of center relative to the clutch axis cause the bearing 20 to move relative to the carrier 11 and to center itself with respect to the clutch axis. The bearing 20 is held in its centered position by friction at the contacting surface of the bearing 20 and the flange 14 arising from pressure contact maintained by springs 33.

I claim:

1. A clutch release mechanism comprising a clutch release bearing carrier having a support portion constructed to engage a support member and to be axially displaceable relative thereto, a clutch release bearing constructed to engage a release member of a clutch assembly, said carrier having a radially extending flange, said clutch release bearing having a radially extending flange slidably engaging one side of said flange of said carrier, said clutch release bearing being radially displaceable relative to said carrier to accommodate misalignment between the axis of said support member and the axis of rotation of said release member, a clutch release lever having spaced portions engaging the other side of said flange of said carrier, spring means engaging said flange of said bearing constructed to urge said flange of said bearing into engagement with said flange of said carrier.

2. A clutch release mechanism comprising a clutch release bearing carrier having a support portion constructed to engage a support member and to be axially displaceable relative thereto, a clutch release bearing constructed to engage a release member of a clutch assembly, said carrier having a radially extending flange, said clutch release bearing having a radially extending flange slidably engaging one side of said flange of said carrier, said clutch release bearing being radially displaceable relative to said carrier to accommodate misalignment between the axis of said support member and the axis of rotation of said release member, a clutch release lever having spaced portions engaging the other side of said flange of said carrier, a spring engaging said flange of said bearing and said release lever constructed to urge said flange of said bearing and said release lever into engagement with said flange of said carrier.

3. A clutch release mechanism comprising a clutch release bearing carrier having a support portion constructed to engage a support member and to be axially displaceable relative thereto, a clutch release bearing constructed to engage a release member of a clutch assembly, said carrier having a radially extending flange, said clutch release bearing having a radially extending flange slidably engaging one side of said flange of said carrier, said clutch release bearing being radially displaceable relative to said carrier to accommodate misalignment between the axis of said support member and the axis of rotation of said release member, a clutch release lever having spaced portions engaging the other side of said flange of said carrier, a spring engaging said flange of said bearing and said release lever constructed to urge said flange of said bearing and said release lever into engagement with said flange of said carrier, said spring being spaced apart from said flange of said carrier.

4. A clutch release mechanism according to claim 3 and including:

said clutch release bearing having an inner race constructed to engage said release member of said clutch assembly, said clutch release bearing having an outer race engaging said bearing carrier.

5. A clutch release mechanism according to claim 3 and including:

said clutch release bearing having an inner race constructed to engage said release member of said clutch assembly, said clutch release bearing having an outer race, said flange of said clutch release bearing being affixed to said outer race.

6. A clutch release mechanism in which:

a clutch release bearing carrier has a radially extending flange;

spring means extend between a clutch release bearing on one side of the flange and a clutch release lever on the other side of the flange to hold both the bearing and the lever in contact with the flange;

the clutch release bearing has limited radial movement relative to the flanges of the bearing carrier so that in use it centers itself about the axis of rotation of the clutch and is held in a centered position by friction at the contacting radially extending surfaces of the bearing and the flange;

a plurality of projections formed in the side of the flange of the carrier engaged with the bearing are received within corresponding apertures in the bearing;

said apertures being larger than the projections to allow said limited radial movement.

7. A clutch release mechanism comprising a clutch release bearing carrier having a support portion constructed to engage a support member and to be axially displaceable relative thereto, a clutch release bearing constructed to engage a release member of a clutch assembly, said carrier having a radially extending flange, said clutch release bearing having a radially extending flange slidably engaging one side of said flange of said carrier, said clutch release bearing being radially displaceable relative to said carrier to accommodate misalignment between the axis of said support member and the axis of rotation of said release member, a clutch release lever having spaced portions engaging the other side of said flange of said carrier, a spring engaging said flange of said bearing and said release lever constructed to urge said flange of said bearing and said release lever into engagement with said flange of said carrier, said spring being spaced apart from said flange of said carrier, said flanges having aligned detent means constructed to limit the permissible radial displacement of said bearing relative to said bearing carrier.

8. A clutch release mechanism comprising a clutch release bearing carrier having a support portion constructed to engage a support member and to be axially displaceable relative thereto, a clutch release bearing constructed to engage a release member of a clutch assembly, said carrier having a radially extending flange, said clutch release bearing having a radially extending flange slidably engaging one side of said flange of said carrier, said clutch release bearing being radially displaceable relative to said carrier to accommodate misalignment between the axis of said support member and the axis of rotation of said release member, a clutch release lever having spaced portions engaging the other side of said flange of said carrier, a spring engaging said flange of said bearing and said release lever constructed to urge said flange of said bearing and said release lever into engagement with said flange of said carrier, said spring being spaced apart from said flange of said carrier, said clutch release bearing having an inner race constructed to engage said release member of said clutch assembly, said clutch release bearing having an outer race, said flange of said clutch release bearing being affixed to said outer race, said flanges having aligned detent means constructed to limit the permissible radial displacement of said bearing relative to said bearing carrier.

* * * * *